United States Patent
Gross et al.

(10) Patent No.: US 9,158,643 B2
(45) Date of Patent: Oct. 13, 2015

(54) ADAPTIVE MINIUMUM VARIANCE CONTROL SYSTEM WITH EMBEDDED DIAGNOSTIC FEATURE

(75) Inventors: Eric Michael Gross, Rochester, NY (US); Palghat Srinivas Ramesh, Pittsford, NY (US); Peter Paul, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 861 days.

(21) Appl. No.: 13/405,388

(22) Filed: Feb. 27, 2012

(65) Prior Publication Data

US 2013/0226524 A1    Aug. 29, 2013

(51) Int. Cl.
| | |
|---|---|
| *G06F 11/30* | (2006.01) |
| *H04N 1/64* | (2006.01) |
| *G03G 15/00* | (2006.01) |
| *G03G 15/01* | (2006.01) |
| *B41J 29/393* | (2006.01) |
| *G06K 15/02* | (2006.01) |
| *H04N 1/60* | (2006.01) |

(52) U.S. Cl.
CPC .............. *G06F 11/30* (2013.01); *B41J 29/393* (2013.01); *G03G 15/0131* (2013.01); *G03G 15/50* (2013.01); *G06K 15/02* (2013.01); *H04N 1/6033* (2013.01); *H04N 1/6036* (2013.01); *H04N 1/642* (2013.01)

(58) Field of Classification Search
CPC ........ G06F 11/30; H04N 1/642; G06K 15/02; G03G 15/50; G03G 15/0131; G03G 15/5041; B41J 29/393
USPC .......................................... 709/186; 702/186
See application file for complete search history.

(56) References Cited

U.S. PATENT DOCUMENTS

| | | | |
|---|---|---|---|
| 5,434,430 A * | 7/1995 | Stewart .......................... | 250/573 |
| 6,032,004 A | 2/2000 | Mirabella, Jr. et al. | |
| 7,500,204 B2 | 3/2009 | Pineda De Gyvez et al. | |
| 7,650,019 B2 * | 1/2010 | Turke et al. ................... | 382/112 |
| 7,852,761 B2 | 12/2010 | Neugebauer | |
| 7,882,394 B2 | 2/2011 | Hosek et al. | |
| 2002/0141769 A1 * | 10/2002 | Phillips ........................... | 399/38 |
| 2003/0081214 A1 * | 5/2003 | Mestha et al. ................. | 356/402 |
| 2008/0082312 A1 * | 4/2008 | Dash et al. ....................... | 703/25 |
| 2010/0100377 A1 | 4/2010 | Madhavapeddi et al. | |
| 2011/0064429 A1 * | 3/2011 | Izumi et al. ..................... | 399/27 |
| 2011/0173496 A1 | 7/2011 | Hosek et al. | |

OTHER PUBLICATIONS

Zhang, Time series forecasting using a hybrid ARIMA and neural network model, Nov. 23, 2001, p. 1-17.*

* cited by examiner

*Primary Examiner* — John Breene
*Assistant Examiner* — Eyob Hagos
(74) *Attorney, Agent, or Firm* — Gibb & Riley, LLC

(57) ABSTRACT

Systems and methods perform a first monitoring of a printing engine to produce first data; match a disturbance model that empirically describes types of color variation in a print process to the first data; generate a minimum variance control system based on the identified parameters of the disturbance model. The systems/methods infer a benchmark performance level the minimum variance control system achieves using the disturbance model; adjust operating parameters of a controller of the printing engine to match parameters of the minimum variance control system; perform a second monitoring of the printing engine to produce second data; determine a difference value between the benchmark performance level and the second data. If the difference value is above a first value and below a second value, the process is repeated. If the difference value is above the first value and the second value, an indication that the printing engine needs servicing is provided.

15 Claims, 9 Drawing Sheets

ADAPTIVE MINIUMUM VARIANCE CONTROL SYSTEM WITH EMBEDDED DIAGNOSTIC FEATURE

BACKGROUND

Systems and methods herein generally relate to printer control systems and more particularly to methods and systems that provide an automated disturbance characterization routine that, once complete, automatically designs an optimal controller and projects the best achievable performance based on minimizing the variance of the printer's output color.

In the field, it is often the case that a closed loop control system within a print engine performs at some level that is not well known. The performance of the system is dependent on the characteristics of the disturbances acting on the engine as well as changes in the engine's characteristics, and so can be highly variable. In some cases, the control system may make the performance worse than would be the case if it was open loop, and customers and service technicians are often unaware of such a situation.

SUMMARY

The method provides an automated disturbance characterization routine that, once complete, automatically designs an optimal controller and projects the best achievable performance based on minimizing the variance of the printer's output color. In this way a benchmark performance level for a given machine at a given time can be inferred and compared to the actual performance level. One can judge how well the control system is in fact performing. If there are large differences between actual performance and that benchmark performance projected to be achievable, then the controller may be updated or a service call placed. Either way this routine can be useful in diagnostics as well as in achieving optimal performance in the field.

Exemplary methods and systems herein perform a first monitoring of a printing engine to produce first data, and match a disturbance model that empirically describes types of color variation in a print process to the first data (using a computerized device). The disturbance model can be, for example, a second order autoregressive integrated moving average (ARIMA) model. The matching process can include, for example, performing a time series analysis of the first data.

Methods/systems herein generate a minimum variance control system for disturbances characterized by the disturbance model, and infers a benchmark performance level that the minimum variance control system can achieve using the disturbance model (using the computerized device). The minimum variance control system minimizes the variance of output color of the printing engine. Further, the benchmark performance level is the maximum performance level in the sense of minimizing the output variance, that any linear control system can achieve. The inferring process can remove structured components of the first data and can quantify the residuals.

Methods/systems herein adjust operating parameters of the controller of the printing engine to match parameters of the minimum variance control system, and perform a second monitoring of the printing engine to produce second data. Thus, methods/systems herein can determine a difference value between the benchmark performance level and the second data (using the computerized device). If the difference value is above a first value, but below a second value, the methods/systems herein repeat the first monitoring, the matching, the generating, the inferring, the adjusting, the second monitoring, and the determining (using the computerized device). However, if the difference value is above the first value and the second value, the methods/systems herein provide an indication that the printing engine needs servicing. If the difference value is below the first value and the second value, the methods/systems herein merely periodically repeat the second monitoring process and the determination of the difference value.

These and other features are described in, or are apparent from, the following detailed description.

BRIEF DESCRIPTION OF THE DRAWINGS

Various exemplary systems and methods herein of the systems and methods are described in detail below, with reference to the attached drawing figures, in which.

DETAILED DESCRIPTION

The systems and methods characterize open loop performance of a print engine color control system. This is achieved by fitting data to a class of disturbance models. The class selected (e.g., a second order auto regressive moving average model) is based on prior empirical experience with printing devices. Model fitting and statistical tests can be automated within the machine.

The methods herein infer the best achievable performance by removal of any structured components to the disturbance and quantifying the residuals. This type of performance can be achieved by applying a minimum variance control law.

The systems and methods herein focus on a specific disturbance model that empirically describes many types of color variations in a print process. From experience this model form is suitable, (an example of which is shown below in equation 1.1) and the parameters can be identified by time series analysis. Based on this model, a minimum variance control system can be automatically designed and implemented. Also based on the model parameters, the minimum output variance achievable by feedback control can be inferred. In this way a benchmark is established for best achievable performance.

These systems and methods use the conventional time shift operator z. This operator is defined so that if y(k) represents a signal of interest and k, where k=0, 1, 2, 3, . . . N, is a discrete time index, then $y(k-1)=z^{-1}y(k)$ and likewise $y(k+1)=zy(k)$. So multiplying by the shift operator advances the time index into the future, or dividing by the shift operator advances the time index into the past. This notation enables the algebraic manipulation of linear difference equations that are useful in describing dynamic behavior.

Figure 1:
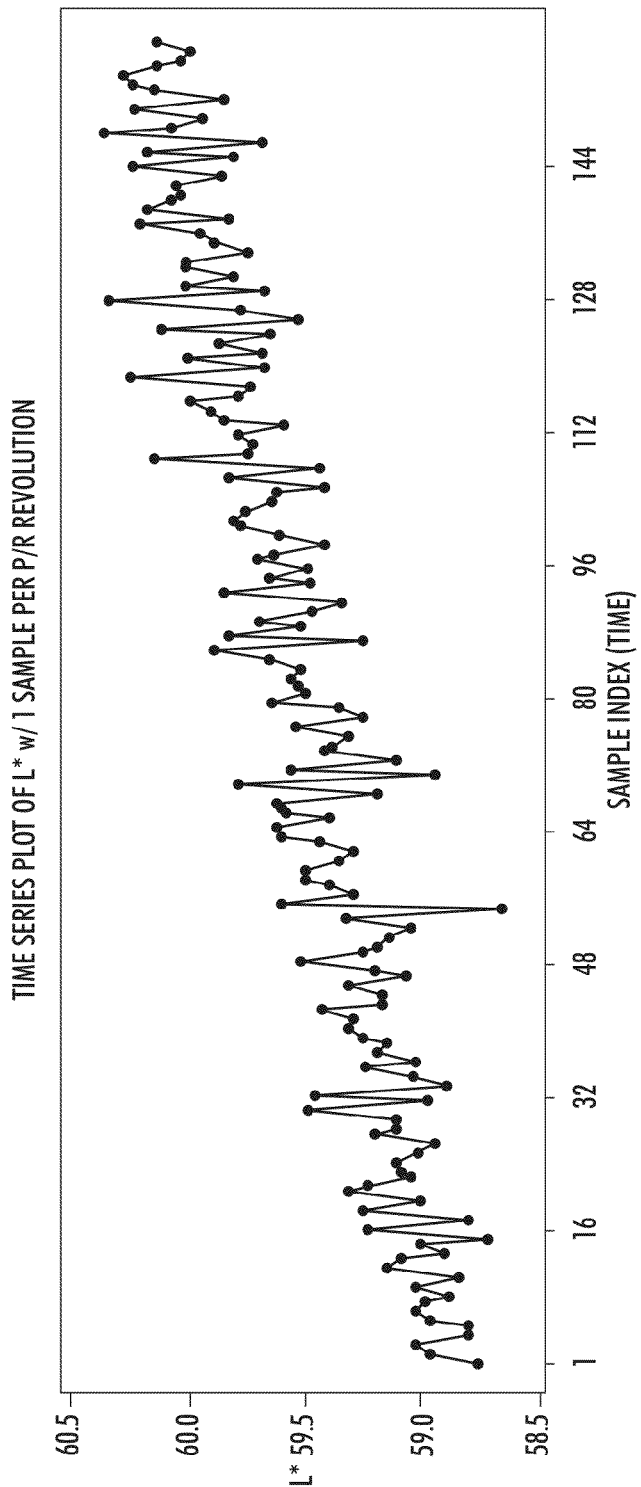
FIG. 1 is a chart illustrating various systems and methods herein.
Figure 2:
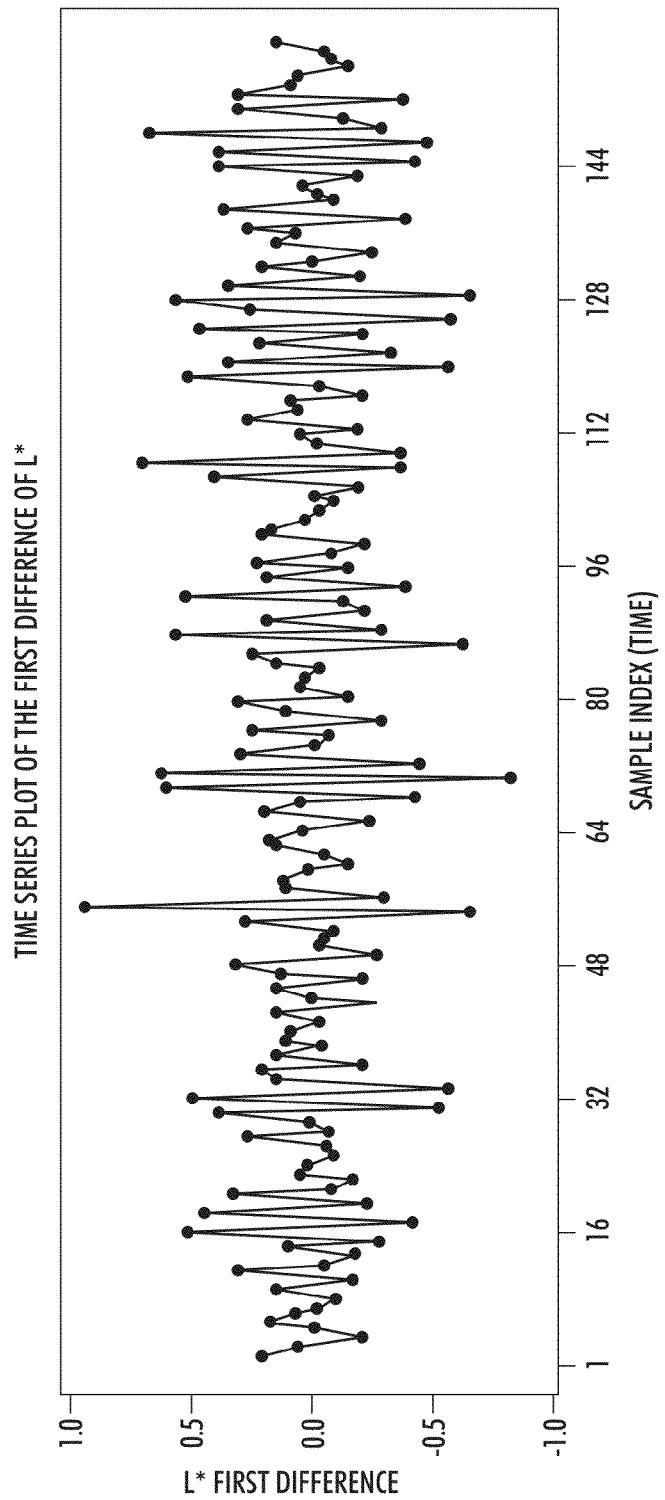
FIG. 2 is a chart illustrating various systems and methods herein.

A typical trace of a printer's open loop behavior is shown in FIG. 1 in which L* reads (a measure of lightness or darkness) are taken at integer multiples of a drum or photoreceptor revolution. The trace is clearly non stationary as is evident by the upward trend. To create a stationary series from a non stationary series this process takes the difference between successive values. The result of differencing the data in FIG. 1 is shown in FIG. 2.

Figure 3:
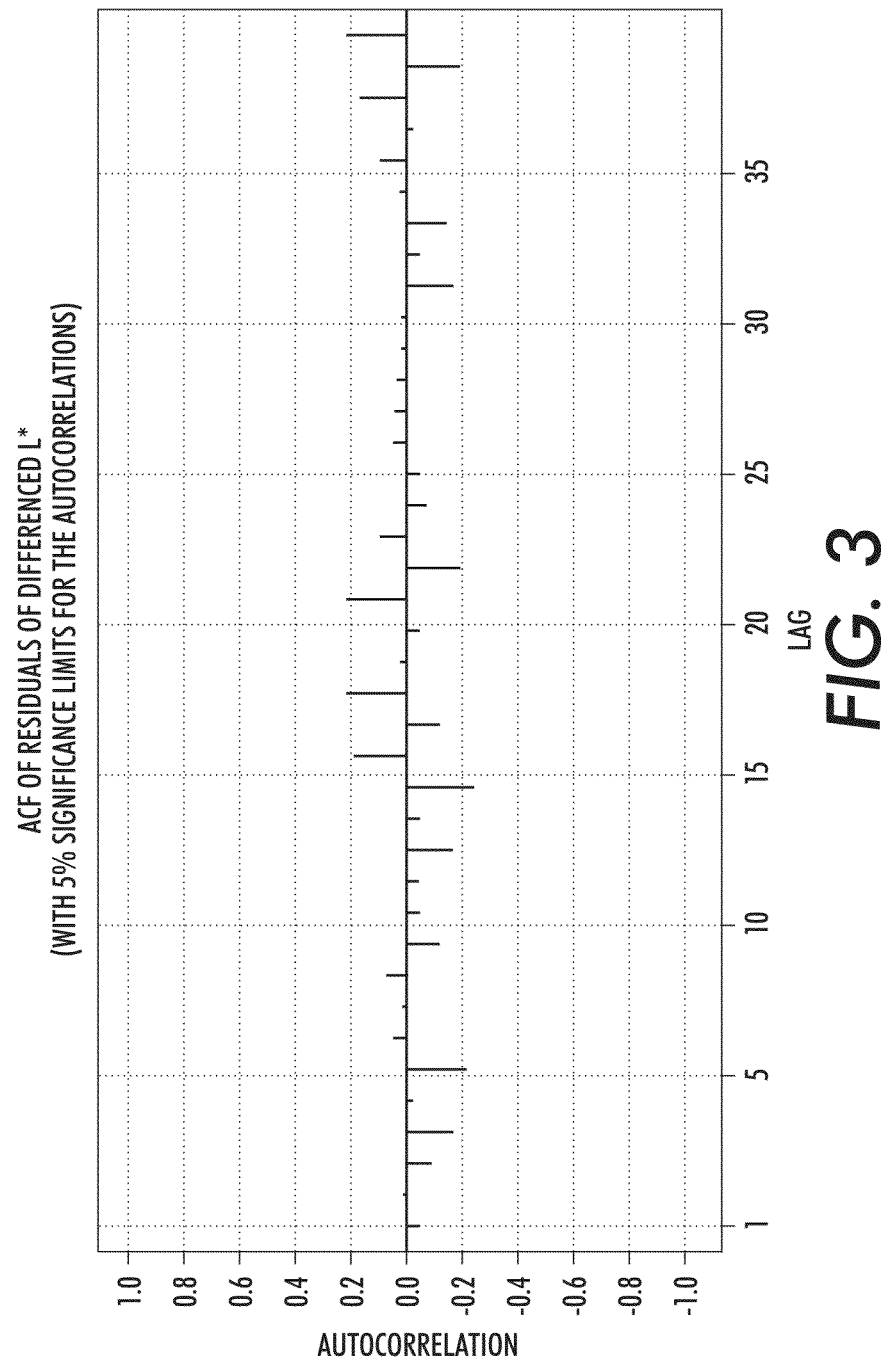
FIG. 3 is a chart illustrating various systems and methods herein.

As shown in FIG. 3, the autocorrelation of the differenced data suggests successful conversion to a stationary process since there is no evidence of a gradual decay.

The differenced data is next fitted to a model with auto regressive and moving average terms. To illustrate, consider the equation below in which the response, y(k) is a function of a discrete time white noise stationary disturbance η(k) and the parameter α, where 0≤α≤1.

$$y(k) = \frac{z-\alpha}{z-1}\eta(k), \text{ or}$$

$$y(k+1) = y(k) + \eta(k+1) - \alpha\eta(k).$$

This equation can model a wide range of time series that are often encountered in practice. The model also has the desirable property that the response can vary from a stationary white noise disturbance (α=1) to a pure random walk (α=0). In fact, for any value of α not equal to 1 the expression is non stationary. Also note that in the denominator the z−1 term appears. Multiplying both sides by z−1 is equivalent to differencing the data and as can be seen above is the reason differencing often converts a non stationary sequence to a stationary sequence. For the data shown in FIG. 1, an improved lease squares fit was obtained by augmenting the equation above with an additional term in the denominator as shown in equation 1.1 below. It is in this model that makes this method applicable to print systems (though in principle any limited set of model structures can be used). The resulting ARIMA model is, excluding the system response to actuator changes, $$y(k) = \frac{z(z-\alpha)}{(z-1)(z-\beta)}\eta(k). \qquad \text{(Equation 1.1)}$$

Figure 4:
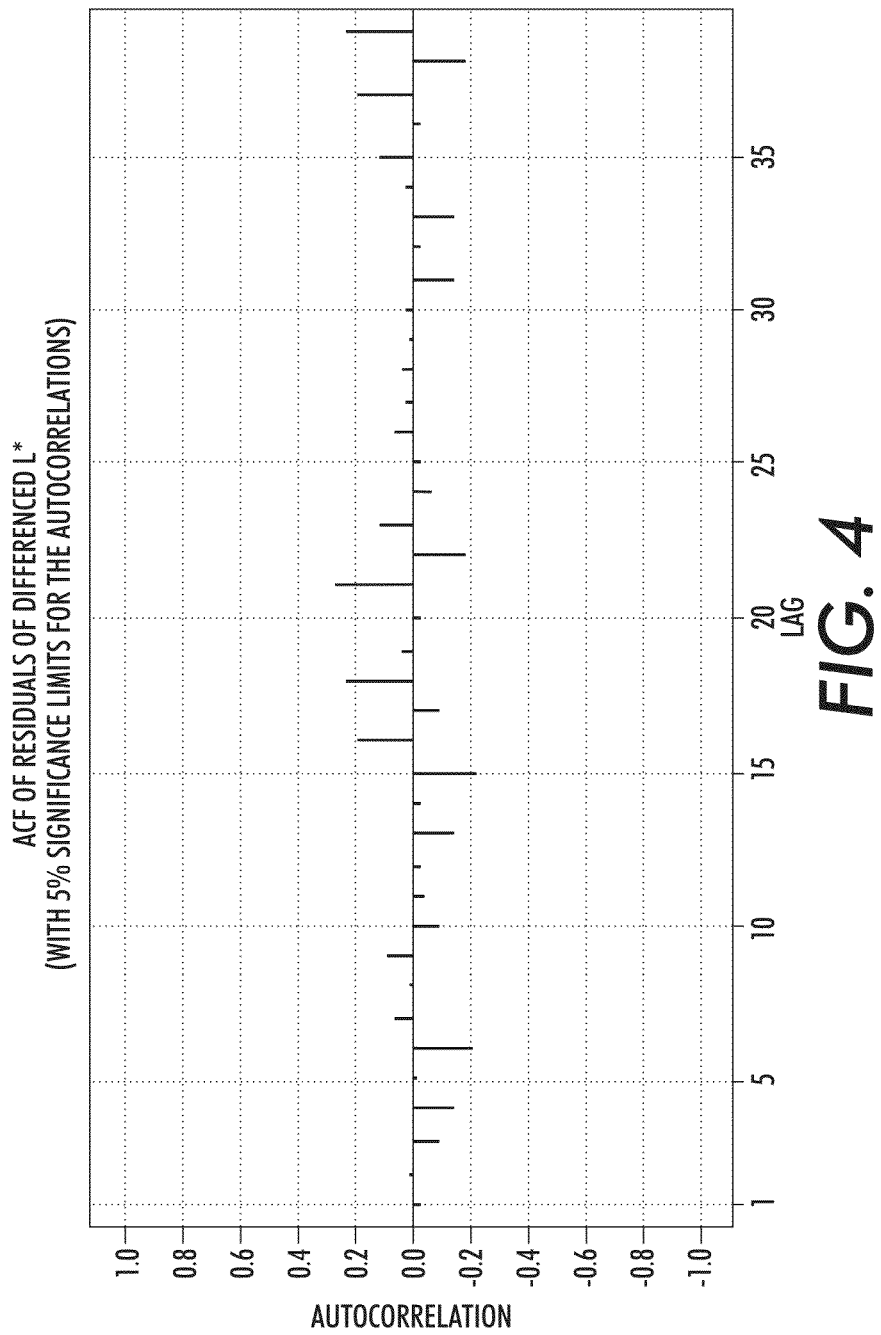
FIG. 4 is a chart illustrating various systems and methods herein.

This augmentation accounts for the non zero autocorrelations in FIG. 3 beyond lag 1. The autocorrelation computed on the residuals of the fit is now shown in FIG. 4. FIG. 4 as well as the residual histogram in FIG. 5 support the conclusion that the residuals are a nearly white noise sequence and are normally distributed and so the fit is reasonable. The white characteristic of the residuals is evident since the values of the autocorrelation function are below the significance thresholds for any lag greater than 0. Though not shown here, the standard residual normality plot, residuals vs. order, and residuals vs. fitted values also support the adequacy of the fit.

Figure 5:
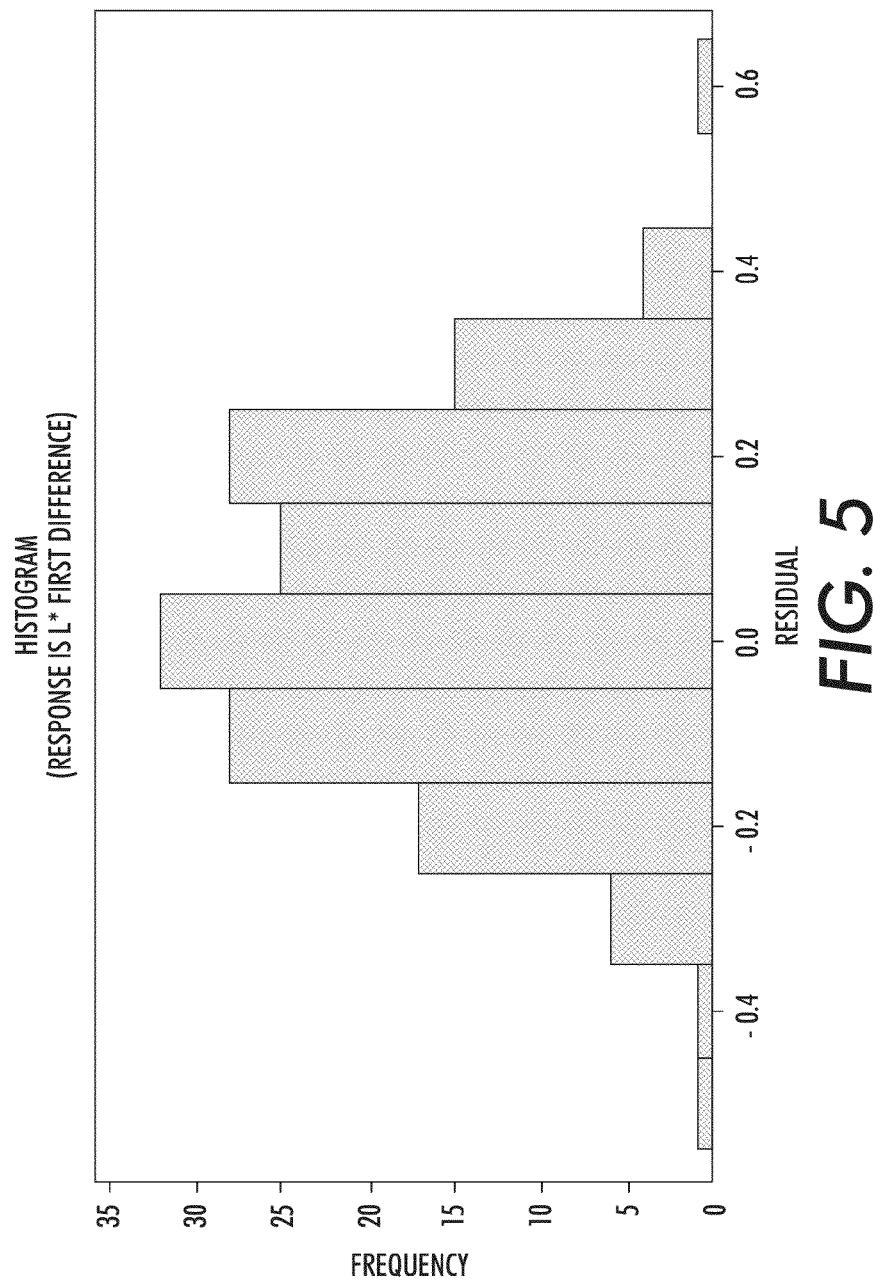
FIG. 5 is a chart illustrating various systems and methods herein.

As shown in FIG. 5, the actual least squares fit to equation 1.1 yielded coefficient estimates of α=0.7037 with a standard error of 0.06 and β=−0.4583 with a standard error of 0.08. The p values computed are less than 0.0005. These values correspond to the probability of obtaining the aforementioned non zero estimates assuming that the coefficients are in fact 0 (the null hypothesis). The disclosure satisfies various goals, such as identifying coefficients α and β. Knowledge of these values is sufficient to project the best achievable performance.

To implement a controller to achieve best achievable performance it is useful to also characterize the actuation. A model that captures the system response to actuator changes (rather than disturbances) is considerably less complex than equation 1.1. In the control of color for electrostatic systems often photoreceptor charge, development field potential, laser intensity, or some combination is the choice of actuator. Over a limited range the system is well approximated as both linear and as responding without delay in continuous time. Representing the actuator by the term u(k) and the response as before by the term y(k), the system model in the absence of disturbances may be represented as, $$y(k) = \frac{K_p}{z}u(k).$$

Here $K_p$ is the system gain that is assumed to be 1 by appropriate choice of units. The unit delay in the denominator captures the physical limitation that the control cannot respond until after a measurement is made.

As shown in the previous section the disturbance color drift model is reasonably represented by an autoregressive integrated moving average (ARIMA) linear transfer function driven by a sequence of white noise shocks, η(k). Combining equations the complete printer model transfer function becomes, $$y(k) = \frac{K_p}{z}u(k) + \frac{z(z-\alpha)}{(z-1)(z-\beta)}\eta(k).$$

Or equivalently, $$y(k+1)=(1+\beta)y(k)-\beta y(k-1)+K_p u(k)-K_p(1+\beta)u(k-1)+K_p\beta u(k-2)+\eta(k+1)-\alpha\eta(k).$$

For feedback control design, it is assumed that without loss of generality the reference target is 0. Minimizing the variance of the system output is then equivalent to minimizing $E((y(k+1)-0)^t)$, where $E(\bullet)$ is the expectation operator. So, $$E(((1+\beta)y(k)-\beta y(k-1)+K_p u(k)-K_p(1+\beta)u(k-1)+K_p\beta u(k-2)-\alpha\eta(k))^2+2((1+\beta)y(k)-\beta y(k-1)+K_p u(k)-K_p(1+\beta)u(k-1)+K_p\beta u(k-2)-\alpha\eta(k))\eta(k+1)+(\eta(k+1))^2).$$

To minimize the expression above the disclosure observes that the last term is simply the variance of η(k+1) and cannot be reduced further by means of controls. The equation also consists of the product of η(k+1) with six other terms. These six terms are not dependent on η(k+1) since they precede it in time and η(k+1) is a random independent noise sequence. Consequently the expected value is necessarily 0. The remaining portion of the equation is, $$E(((1+\beta)y(k)-\beta y(k-1)+K_p u(k)-K_p(1+\beta)u(k-1)+\beta u(k-2)-\alpha\eta(k))^2).$$

This can be minimized by selecting the control, u(k) so that the expression is 0. This is achieved by establishing the control law, $$u(k) = \frac{\alpha z^2 \eta(k) - ((1+\beta)z^2 - \beta z)y(k)}{K_p(z^2 - (1+\beta)z + \beta)}.$$

After some manipulation the control law can be re expressed in implementable form as, $$u(k) = \frac{((\alpha - 1 - \beta)z^2 + \beta z)}{K_P(z^2 - (1+\beta)z + \beta)} y(k).$$

Note, that the controller consists of a pole at 1 and a pole at β. Therefore the controller is equivalent to an integrator and a first order filter acting on the regulation error. If it happens that β=0 the controller reduces to the common PI (proportional plus integral) structure. Substituting coefficient estimates for this example, the actual controller transfer function that is implemented becomes, $$u(k) = \frac{-.162z^2 + .4583z}{z^2 - .5417z - .4583} y(k).$$

Figure 6:
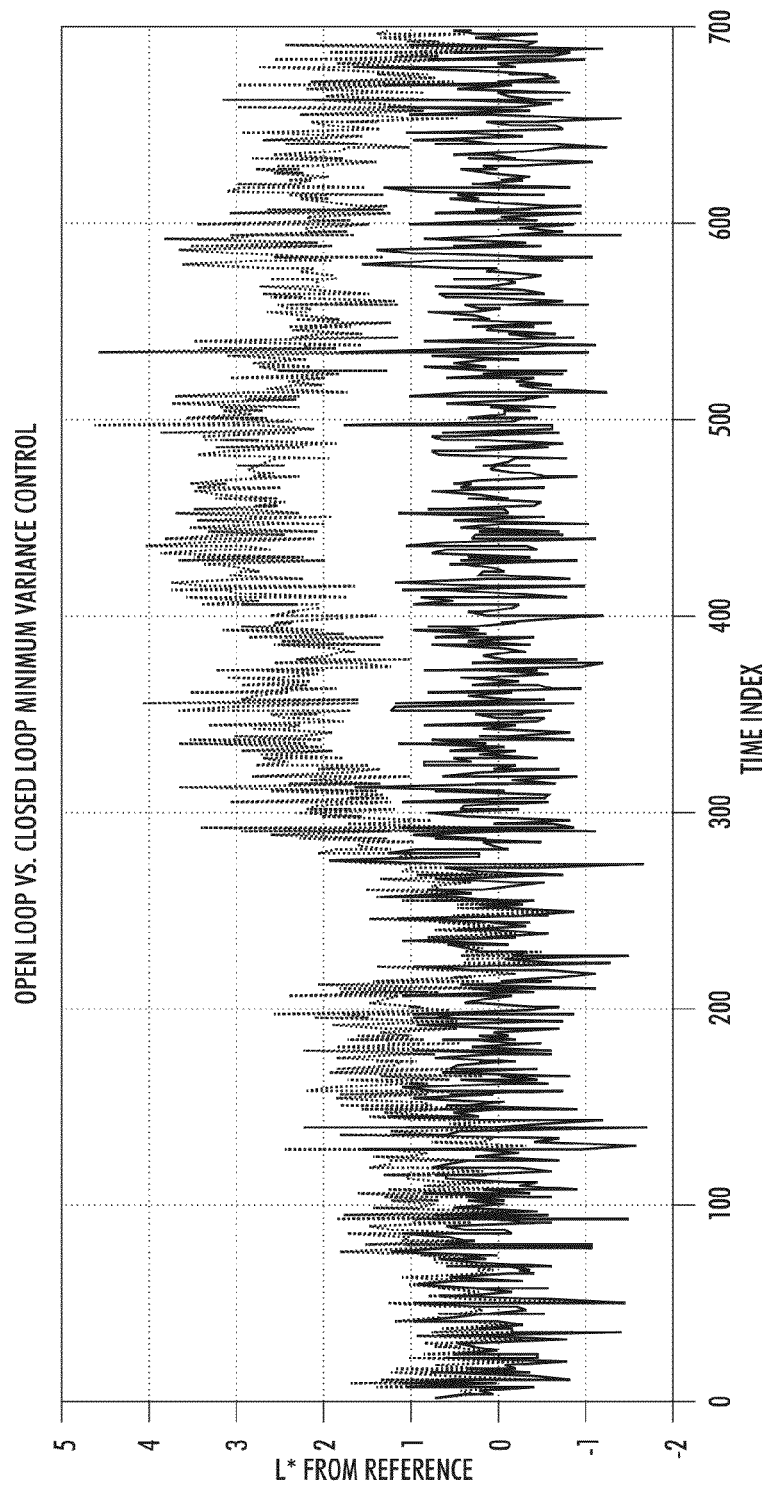
FIG. 6 is a chart illustrating various systems and methods herein.
Figure 7:
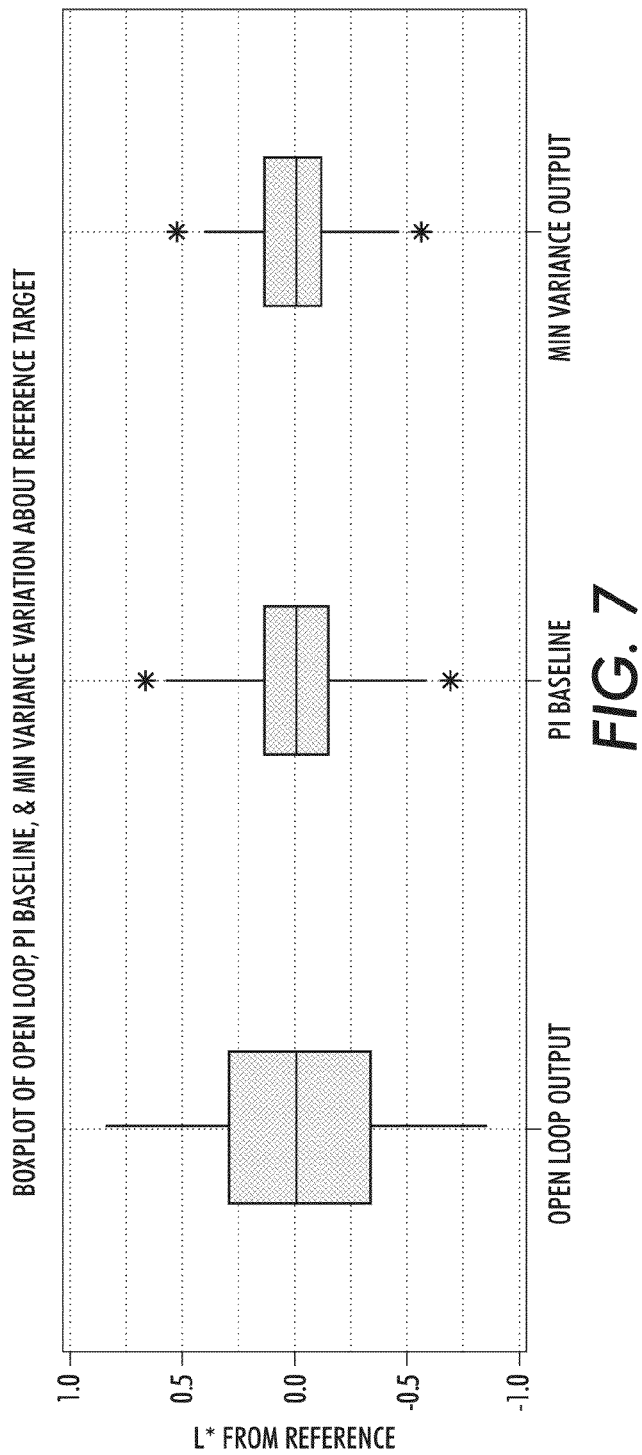
FIG. 7 is a chart illustrating various systems and methods herein.

FIG. 6 shows an example of the uncompensated system output and the compensated system output using the minimum variance control law. In this case, the disturbance filter was driven by simulated white noise. In FIG. 7, an actual recorded disturbance trace acted as input to the simulation and box plots of the resulting steady state performance are shown.

In comparison to a baseline integral control in which the gain is optimally tuned by the minimum variance approach the variance is reduced. The integral control gain is tuned by the minimum variance approach with respect to the simpler noise first order disturbance model structure. The more accurate noise model given by equation (second order) is what is actually used in the simulation.

Thus, as shown above, the systems and methods herein establish the limits on achievable performance for color control. Characterizing the dynamic behavior of the disturbance is a useful step in this process for two reasons. First, it can establish estimates on the limit of achievable performance capable by a feedback approach. Secondly, the disturbance models that are estimated over time can be studied and may lead the engineer to question the dynamic behavior of the system and search for the fundamental cause of this behavior. This is an extension of statistical process control (SPC) to the tracking of dynamic systems (coefficients and order). This in turn can result in improved understanding so that one can efficiently proceed to the next steps of performance improvement. This method represents the synthesis of system identification and control concepts as applied to print engines.

Figure 8:
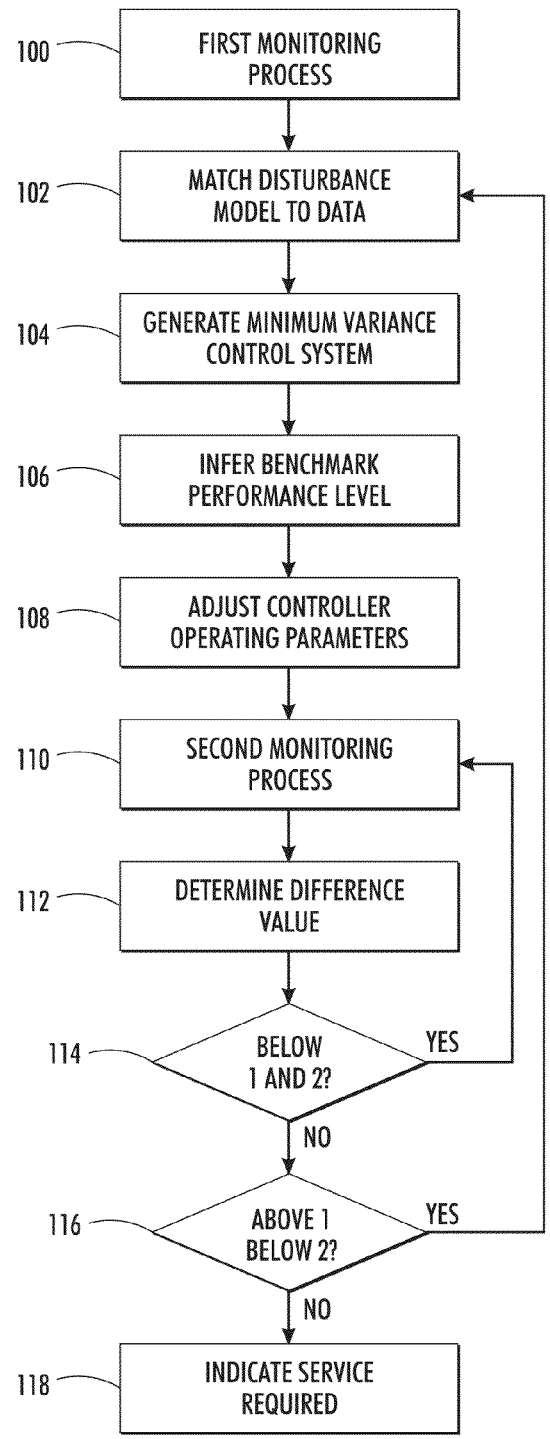
FIG. 8 is a flowchart illustrating various methods herein.

FIG. 8 illustrates the foregoing in flowchart form. In item 100, this method begins by performing a first monitoring process of a printing engine to produce first data. The data indicates the amount of disturbance present in the printing system. For purposes herein, disturbance is considered a variation from targeted printing results (such as color results) that can occur over time because of toner inconsistency, wear on parts, changes in ambient temperature, humidity, dust accumulation, etc.

Next, in item 102, this method matches a disturbance model that empirically describes types of color variation in a print process to the first data (using a computerized device). The disturbance model can be, for example, a second order autoregressive integrated moving average (ARIMA) model. The matching process in item 102 can include, for example, performing an automated time series analysis of the first data.

As shown in item 104, this exemplary method generates a theoretically perfect "minimum variance" suitably incorporating into the control system the parameters of the disturbance model. The minimum variance control system minimizes the variance of output color of the printing engine. In item 106, this method infers a benchmark performance level that the minimum variance control system can achieve using the disturbance model. For example, the benchmark performance level is the maximum performance level the minimum variance control system could theoretically achieve. The inferring process in item 106 can remove structured components of the first data and can quantify the residuals.

Next, in item 108, this method adjusts the operating parameters of the controller of the printing engine to match parameters of the minimum variance control system. For example, the various gain levels, etc., of the controller can be adjusted. Then, this method performs a second monitoring of the printing engine to produce second data in item 110. Thus, methods/systems herein can determine a difference value between the benchmark performance level and the second data (using the computerized device) in item 112.

As shown in item 114, if the difference value is below a first value and a second value (meaning that performance is within an acceptable range) the methods/systems herein merely periodically repeat the second monitoring process and the determination of the difference value. As shown in item 116, if the difference value is above the first value, but still below the second value (meaning that performance has slipped outside the acceptable range, but is not bad enough to indicate component failure) the methods/systems herein repeat the first monitoring, the matching, the generating, the inferring, the adjusting, the second monitoring, and the determining (using the computerized device). However, as show in item 118, if the difference value is above both the first value and the second value (indicating component failure) the methods/systems herein provide an indication that the printing engine needs servicing.

Figure 9:
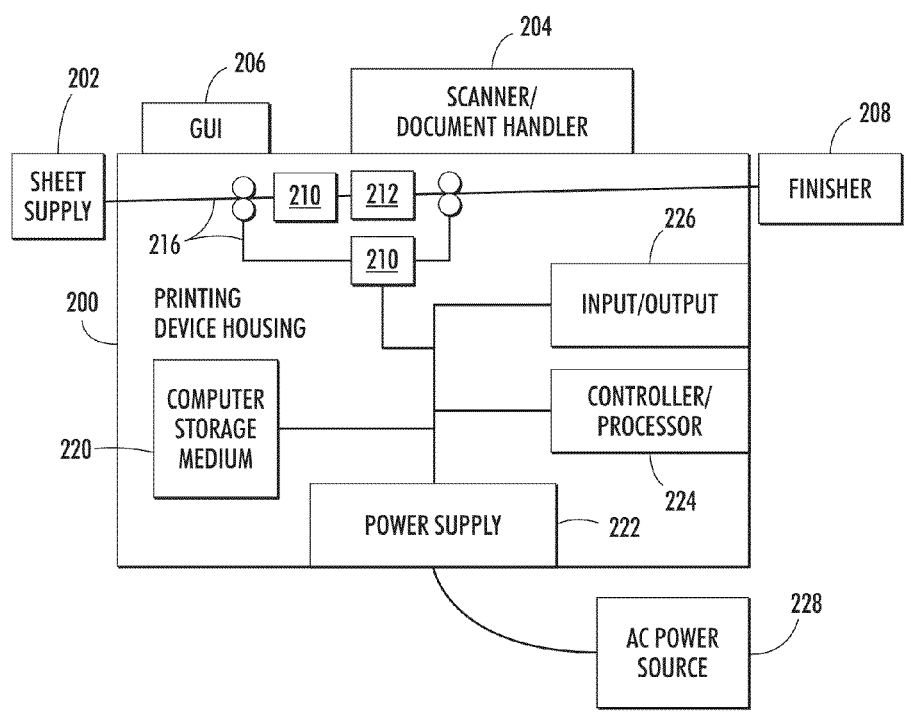
FIG. 9 is a side-view schematic diagram of a device according to systems herein.

FIG. 9 illustrates a computerized printing device 200, which can be used with systems and methods herein and can comprise, for example, a printer, copier, multi-function machine, etc. The printing device 200 includes a controller/processor 224, at least one marking device (printing engines) 210 operatively connected to the processor 224, a media path 216 positioned to supply sheets of media from a sheet supply 202 to the marking device(s) 210 and a communications port (input/output) 226 operatively connected to the processor 224 and to a computerized network external to the printing device. After receiving various markings from the printing engine(s), the sheets of media can optionally pass to a finisher 208 which can fold, staple, sort, etc., the various printed sheets.

Also, the printing device 200 can include at least one accessory functional component (such as a scanner/document handler 204, sheet supply 202, finisher 208, etc.) and graphic user interface assembly 206 that also operate on the power supplied from the external power source 228 (through the power supply 222).

The input/output device 226 is used for communications to and from the multi-function printing device 200. The processor 224 controls the various actions of the printing device. A non-transitory computer storage medium device 220 (which can be optical, magnetic, capacitor based, etc.) is readable by the processor 224 and stores instructions that the processor 224 executes to allow the multi-function printing device to perform its various functions, such as those described herein.

Thus, a printer body housing 200 has one or more functional components that operate on power supplied from the alternating current (AC) 228 by the power supply 222. The power supply 222 connects to an external alternating current power source 228 and converts the external power into the type of power needed by the various components.

In such a computerized (printing) device sensors 212 are operatively connected to the controller 224. The sensors 212 perform the first monitoring of the printing engine 210 to produce first data. The controller 224 matches the disturbance model that empirically describes types of color variation in a print process to the first data. The controller 224 generating a minimum variance control system that matches parameters of the disturbance model. The controller 224 infers the benchmark performance level the minimum variance control system achieves using the disturbance model. The controller 224 also adjusts the operating parameters of itself or another controller of the printing engine 210 to match parameters of the minimum variance control system. The sensors 212 perform a second monitoring of the printing engine 210 to produce second data. The controller 224 determines the difference value between the benchmark performance level and the second data. Again, if the difference value is above a first value and below a second value, the controller 224 repeats the first monitoring, the matching, the generating, the inferring, the adjusting, the second monitoring, and the determining. If the difference value is above the first value and the second value, the controller 224 provides an indication that the printing engine 210 needs servicing.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The systems and methods herein can encompass systems and methods herein that print in color, monochrome, or handle color or monochrome image data. All foregoing systems and methods herein are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass systems and methods herein in hardware, software, and/or a combination thereof. Unless specifically defined in a specific claim itself, steps or components of the systems and methods herein cannot be implied or imported from any above example as limitations to any particular order, number, position, size, shape, angle, color, or material.

What is claimed is:

1. A method comprising:
    performing a first monitoring of printing results of a printing engine by finding how said printing results vary from targeted print results to produce first data, using a computerized device, said first data comprising variations from said targeted print results;
    matching a disturbance model that empirically describes types of color variation in a print process to said first data, using said computerized device;
    generating a minimum variance control system based on identified parameters of said disturbance model, using said computerized device;
    inferring a benchmark performance level said minimum variance control system achieves using said disturbance model, using said computerized device, said minimum variance control system minimizing a variance of output color of said printing engine, said benchmark performance level comprising a maximum performance level said minimum variance control system can achieve;
    adjusting operating parameters of a controller of said printing engine based on identified parameters of said minimum variance control system, using said computerized device;
    performing a second monitoring of said printing engine to produce second data, after said adjusting of said operating parameters, using said computerized device;
    determining a difference value between said benchmark performance level and said second data, using said computerized device;
    if said difference value is above a first value and below a second value, repeating said first monitoring, said matching, said generating, said inferring, said adjusting, said second monitoring, and said determining, using said computerized device; and
    if said difference value is above said first value and said second value, providing an indication that said printing engine needs servicing, using said computerized device.

2. The method according to claim 1, if said difference value is below said first value and said second value, periodically repeating said second monitoring and said determining of said difference value.

3. The method according to claim 1, said disturbance model comprising an autoregressive integrated moving average (ARIMA) model.

4. The method according to claim 1, said matching of said disturbance model comprising performing a time series analysis of said first data.

5. The method according to claim 1, said inferring of said benchmark performance level comprising removing structured components of said first data and quantifying residuals.

6. A printer apparatus comprising:
a controller;
a printing engine operatively connected to said controller; and
sensors operatively connected to said controller, said sensors performing a first monitoring of printing results of said printing engine by finding how said printing results vary from targeted print results to produce first data;
said first data comprising variations from said targeted print results;
said controller based on identified disturbance model that empirically describes types of color variation in a print process to said first data;
said controller generating a minimum variance control system based on identified parameters of said disturbance model;
said controller inferring a benchmark performance level said minimum variance control system achieves using said disturbance model, said minimum variance control system minimizing a variance of output color of said printing engine, said benchmark performance level comprising a maximum performance level said minimum variance control system can achieve;
said controller adjusting operating parameters of a controller of said printing engine to match parameters of said minimum variance control system;
said sensors performing a second monitoring of said printing engine after said adjusting of said operating parameters to produce second data;
said controller determining a difference value between said benchmark performance level and said second data;
if said difference value is above a first value and below a second value, said controller repeating said first monitoring, said matching, said generating, said inferring, said adjusting, said second monitoring, and said determining; and
if said difference value is above said first value and said second value, said controller providing an indication that said printing engine needs servicing.

7. The printer apparatus according to claim 6, if said difference value is below said first value and said second value, periodically repeating said second monitoring and said determining of said difference value.

8. The printer apparatus according to claim 6, said disturbance model comprising an autoregressive integrated moving average (ARIMA) model.

9. The printer apparatus according to claim 6, said matching of said disturbance model comprising performing a time series analysis of said first data.

10. The printer apparatus according to claim 6, said inferring of said benchmark performance level comprising removing structured components of said first data and quantifying residuals.

11. A non-transitory storage medium readable by a computerized device, said non-transitory storage medium storing instructions executed by said computerized device to perform a method comprising:
performing a first monitoring of printing results of a printing engine by finding how said printing results vary from targeted print results to produce first data, using a computerized device, said first data comprising variations from said targeted print results;
matching a disturbance model that empirically describes types of color variation in a print process to said first data;
generating a minimum variance control system based on identified parameters of said disturbance model;
inferring a benchmark performance level said minimum variance control system achieves using said disturbance model, said minimum variance control system minimizing a variance of output color of said printing engine, said benchmark performance level comprising a maximum performance level said minimum variance control system can achieve;
adjusting operating parameters of a controller of said printing engine based on identified parameters of said minimum variance control system;
performing a second monitoring of said printing engine to produce second data, after said adjusting of said operating parameters;
determining a difference value between said benchmark performance level and said second data;
if said difference value is above a first value and below a second value, repeating said first monitoring, said matching, said generating, said inferring, said adjusting, said second monitoring, and said determining; and
if said difference value is above said first value and said second value, providing an indication that said printing engine needs servicing.

12. The non-transitory storage medium according to claim 11, if said difference value is below said first value and said second value, said method further comprising periodically repeating said second monitoring and said determining of said difference value.

13. The non-transitory storage medium according to claim 11, said disturbance model comprising a second order autoregressive integrated moving average (ARIMA) model.

14. The non-transitory storage medium according to claim 11, said matching of said disturbance model comprising performing a time series analysis of said first data.

15. The non-transitory storage medium according to claim 11, said inferring of said benchmark performance level comprising removing structured components of said first data and quantifying residuals.

* * * * *